United States Patent [19]
Yamada et al.

[11] Patent Number: 5,809,563
[45] Date of Patent: Sep. 15, 1998

[54] METHOD AND APPARATUS UTILIZING A REGION BASED PAGE TABLE WALK BIT

[75] Inventors: Koichi Yamada, San Jose; Gary Neil Hammond, Campbell, both of Calif.

[73] Assignee: Institute for the Development of Emerging Architectures, LLC, Cupertino, Calif.

[21] Appl. No.: 747,943

[22] Filed: Nov. 12, 1996

[51] Int. Cl.[6] ................................................ G06F 12/10
[52] U.S. Cl. ........................................ 711/207; 711/206
[58] Field of Search .................................. 711/206, 207, 711/208, 209

[56] References Cited

PUBLICATIONS

Gregg Wyant & Tucker Hammerstrom, *How Microprocessors Work*, 98–103 (1994).
PowerPC 601 RISC Microprocessor User's Manual, Chapter 6: *Memory Management Unit*, Motorola Inc. (1993).

*Primary Examiner*—Jack A. Lane
*Attorney, Agent, or Firm*—Blakely Sokoloff Taylor & Zafman, LLP

[57] ABSTRACT

A method and an apparatus for translating a virtual address into a physical address in a multiple region virtual memory environment. In one embodiment, a translation lookaside buffer (TLB) is configured to provide page table entries to build a physical address. The TLB is supplemented with a virtual hash page table (VHPT) to provide TLB entries in the occurrences of TLB misses. An alternate software replacement scheme may be utilized on a per region basis instead of the default page table walk of the VHPT with a dedicated bit associated with each particular region of the disclosed virtual address space. A VHPT walk is performed only if the particular bit for the particular region and a master enable bit are both enabled. Otherwise, the alternate software replacement routine is performed to provide TLB replacements in the occurrences of TLB misses.

13 Claims, 5 Drawing Sheets

METHOD AND APPARATUS UTILIZING A REGION BASED PAGE TABLE WALK BIT

BACKGROUND OF THE INVENTION

1. Field of the Invention

The present invention relates generally to microprocessor based computer systems and more specifically, the present invention relates to memory management units for use in conjunction with high performance microprocessors.

2. Description of the Related Art

Modern microprocessor based computer systems typically utilize virtual addressing. Virtual addressing enables the computer system to create a virtual memory space larger than the actual physical memory space. In general, a virtual memory environment is supported by organizing partitions of the main memory into pages to create a large addressable memory space. For instance, without virtual memory, a prohibitively large amount of main memory might be needed to store and execute multiple applications. With virtual memory, only a portion of each application is loaded from the hard disk drive into main memory at a time, allowing multiple programs to run with only a relatively small amount of main memory.

Often, virtual addresses must be translated into physical addresses to support a virtual memory environment. One method a memory management unit of a microprocessor uses to accomplish the translation of virtual addresses into physical addresses is to access page tables stored in memory regularly. Repeated regular access of these translation tables in main memory tends to slow overall system performance.

In order to reduce the need of accessing page tables in memory to accomplish address translation, modern microprocessor systems often use a translation lookaside buffer (TLB) to store or cache recently generated virtual to physical address translations. The TLB can be thought of as a special type of cache memory. The TLB is generally used in connection with a page miss handler which generates a new TLB entry for those addresses not cached within the TLB. In use, the TLB is initially accessed to determine whether the TLB contains the physical address corresponding with a virtual address identifying a particular memory location. If the virtual address is found within the TLB, a "hit" is said to have occurred and the physical address is merely provided directly out of the TLB. If the virtual and physical address are not cached within the TLB, then a TLB "miss" is said to have occurred and the page miss handler is used to provide a replacement TLB entry corresponding with the desired virtual address. Typically, a hardware implemented page miss handler performs a page table walk of a page table stored in main memory to provide the replacement TLB entry. The page miss handler is commonly implemented in hardware to minimize the amount of time necessary to perform a page table walk and provide TLB replacements.

FIG. 1 shows a block diagram of a prior art microprocessor based computer system 101 utilizing a virtual memory environment. In FIG. 1, the elements located above dashed line 103 are generally located in the microprocessor and the elements located below dashed line 103 are located in the main memory of the computer system 101. As shown in FIG. 1, a virtual address 105 is generated and TLB 107 is searched to determine if the TLB contains an entry corresponding with virtual address 105. If a match is found, or if there is a TLB hit, physical address 109 is quickly generated and passed to the bus unit (not shown) for a memory access. In general, most requests for page translation can be serviced by the TLB 107. When a match is not found, or there is a TLB miss, a page table walk is generally performed on page table 111 and a TLB replacement 119 is provided for TLB 107. If the page table walk is disabled in prior art computer system 101, virtual memory is also generally disabled.

The virtual address space of modern microprocessors has been continuously increasing in size. Multiple regions of addressable virtual memory space are supported by a number of modern microprocessors. The increasing virtual address space requires large page table structures. To manage effectively the page table and page table entries, a number of modern computer systems, instead of microprocessors, divide the virtual space into multiple regions of addressable virtual space. Referring back to FIG. 1, N bits 123 of virtual address 105 may be assigned to represent $2^N$ different regions of virtual address space. Each of the $2^N$ regions may be utilized for any number of different uses. Furthermore, each of the variety of different uses for the different regions of virtual memory may have different memory accessing characteristics. Accordingly, an optimal TLB replacement scheme for one region may be different than the optimal TLB replacement scheme for other particular regions of the virtual address space.

A problem with prior art computer system 101 is that it is not possible to implement an optimized routine for one particular region of virtual memory because the TLB replacement scheme applies to all $2^N$ regions of virtual address space in computer system 101. In general, page table walks of page table 111 are optimized in hardware to minimize the amount of time used to provide for general purpose TLB replacements 119.

It is noted that in some other prior art computer systems, the page table walk is implemented in software instead of hardware. The use of software routines to provide TLB replacements in these prior art computer systems allows the algorithms for page table walks to be adjusted if desired. However, the use of software only for all TLB replacements provides less than optimal performance since software performance is generally slower then hardware performance.

Thus, what is needed is a region based page table walking scheme which allows virtual memory region based page table walking. Accordingly, each individual region of virtual address space would have the option to have a separate TLB replacement scheme, independent of the other regions of virtual address space. Such a region based page table walking scheme would provide an increase in overall system speed and increased flexibility in memory management techniques.

SUMMARY OF THE INVENTION

A method and an apparatus for implementing a region based page table walk is disclosed. In one embodiment, an address translation mechanism configured to translate a virtual address of a virtual memory organized into regions into a physical address in the memory coupled to a processor of a computer system is disclosed. The address translation mechanism includes a region register which corresponds with a region of the virtual address. The region register includes an enable indicator. A translation lookaside buffer coupled to the region register and coupled to receive a virtual address is configured to contain a page entry used to determine a physical address. The address translation mechanism includes a default replacing mechanism which is configured to provide the TLB with the page entry in response to a TLB miss when the enable indicator in the region register is in a first state. If the enable indicator of the region register is in a second state, an alternate replacement mechanism included in the address translation mechanism is configured to provide the TLB with the page entry to determine the requested physical address in response to a TLB miss. Additional features and benefits of the present invention will become from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for implementing a region based page table walk is disclosed. In the following description, numerous specific details are set forth, such as memory sizes or numbers of regions, in order to provide a thorough understanding of the present invention. It will be apparent, however, to one having ordinary skill in the art that the specific details need not be employed to practice the present invention. In other instances, well known materials or methods have not been described in detail in order to avoid obscuring the present invention.

Figure 1:
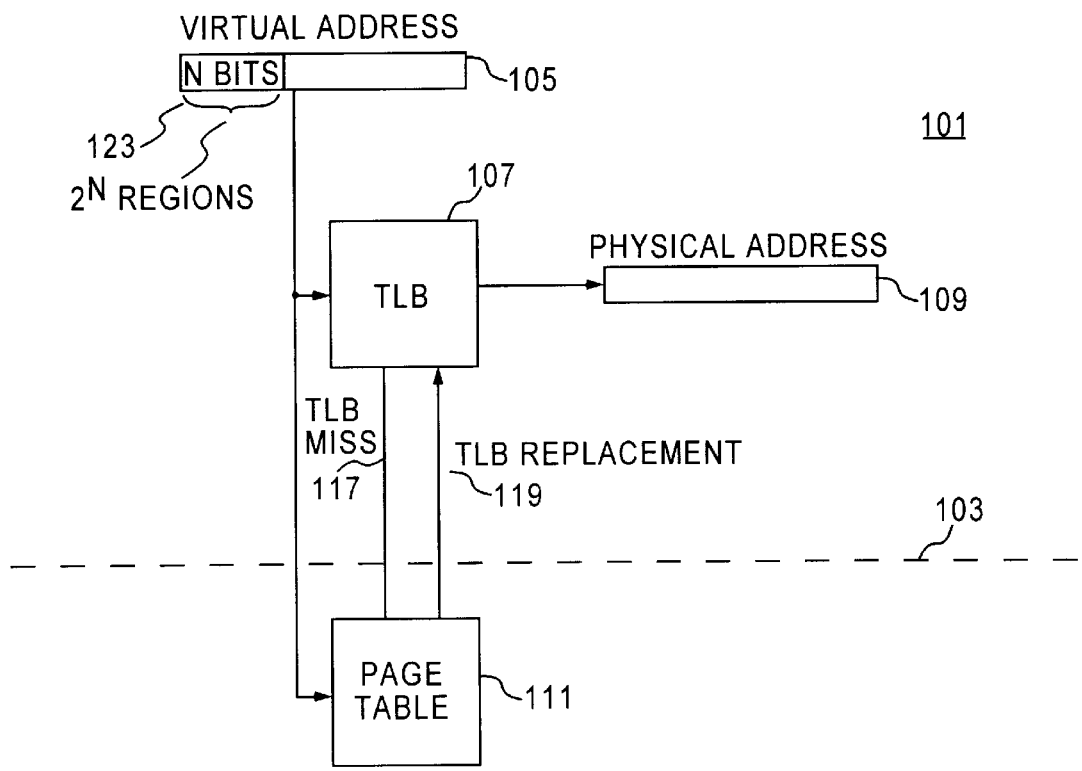
FIG. 1 is a block diagram of a prior art computer system with a TLB and corresponding page table.
Figure 2:
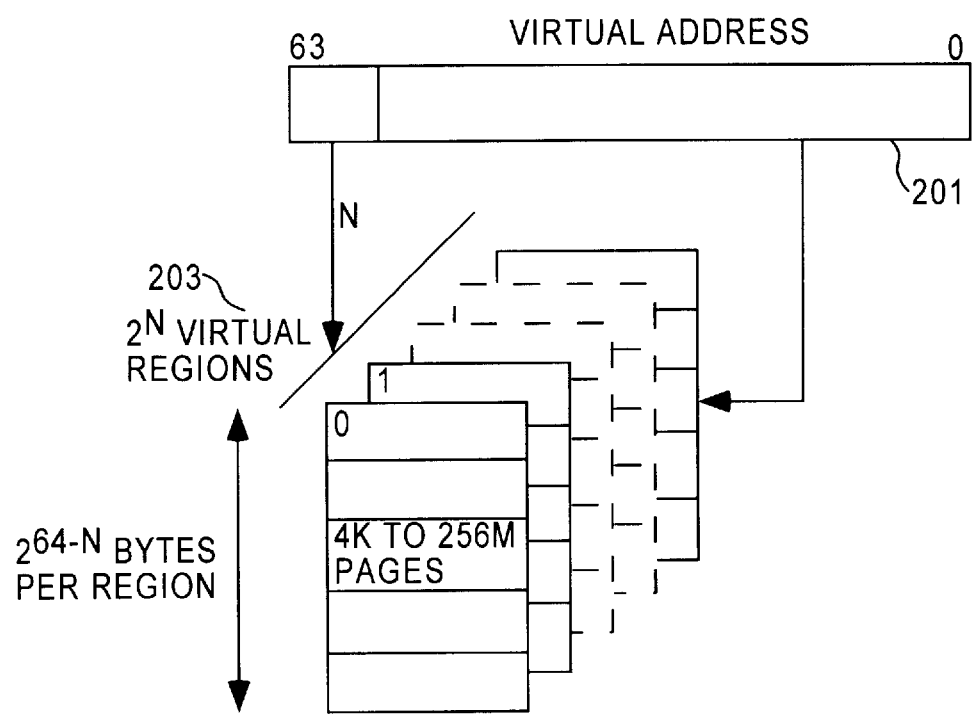
FIG. 2 is a diagram illustrating the different virtual regions which may be addressed by a portion of the bits of a virtual address.

As mentioned earlier, virtual address spaces in modern processors have been increasing in size. FIG. 2 is an illustration of the virtual address space of one embodiment of the present invention. Virtual address 201 includes 64 bits numbered 0 to 63. In one embodiment of the present invention, N upper bits of the virtual address 201 are used to identify $2^N$ or eight different virtual regions 203. As shown in the example illustrated in FIG. 2, each of the different virtual regions thus has $2^{64-N}$ bytes of addressable space.

Operating systems often divide the virtual memory into multiple regions and apply different usage models, protections and paging policies to the different regions. When an operating system needs to apply a different paging policy to a particular region, the optimal translation lookaside buffer (TLB) replacement policy may not be ideal for handling TLB misses in other regions. The present invention allows different TLB replacement policies to be employed for TLB misses occurring in a particular region, without effecting the TLB replacement policies of other regions.

Figure 3:
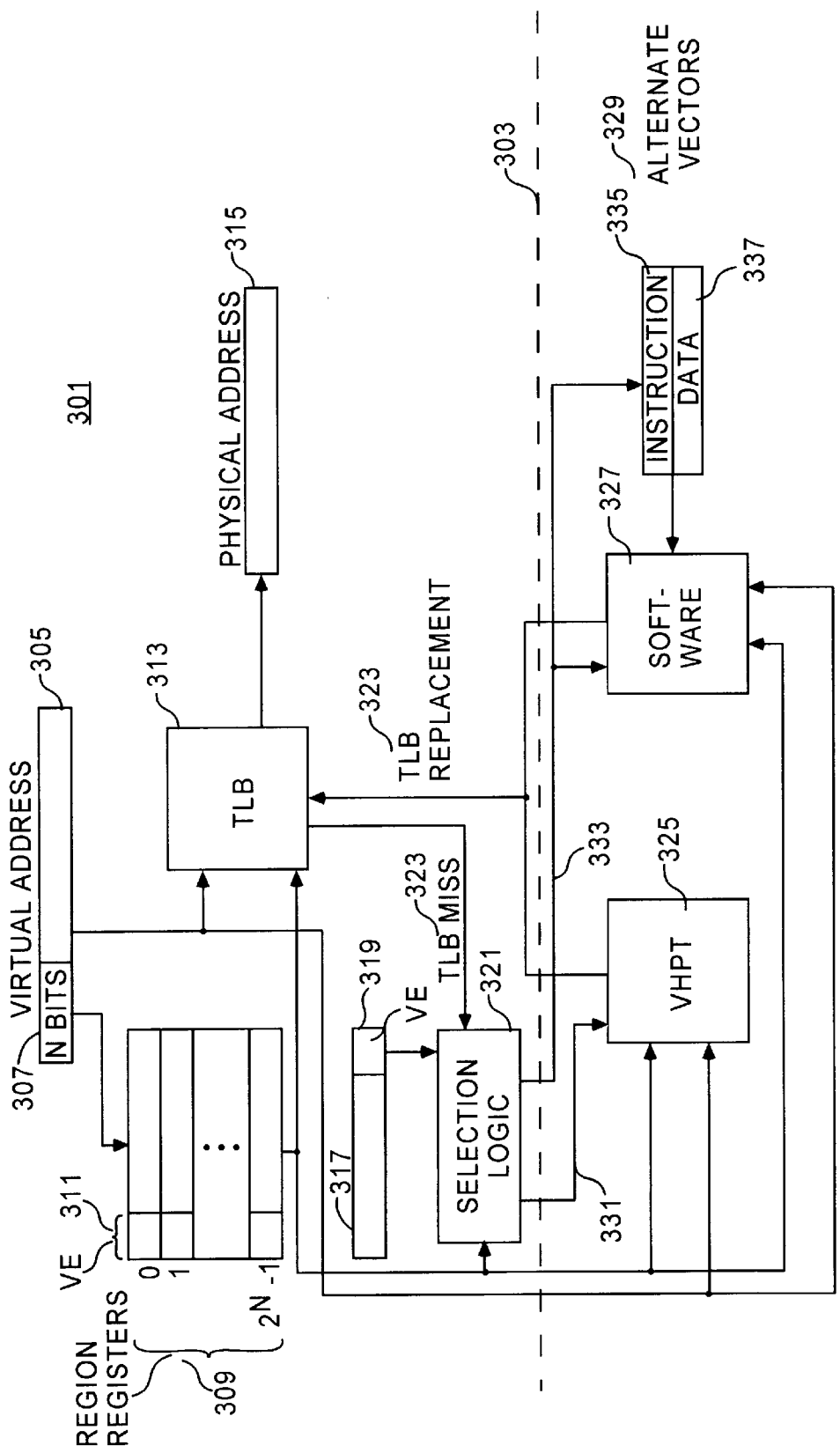
FIG. 3 is a computer system featuring a TLB and regions based page table walking in accordance with the teachings of the present invention.

Referring now to FIG. 3, a block diagram of a computer system 301 in accordance with the teachings of the present invention is shown. In one embodiment of the present invention, those elements above dashed line 303 are located in the memory management unit of a processor of computer system 301 and those elements below dashed line 303 are located within the memory of computer system 301. N bits 307 of virtual address 305 are used to identify $2^N$ different regions. $2^N$ region registers 309 are included in computer system 301. Each individual region register has a one to one correspondence with one of the regions identified by the N bits 307 of virtual address 305. In one embodiment, TLB 313 is coupled to receive the virtual address 305 and a region ID (not shown) from the corresponding region register 309 to produce a page entry to determine a physical address 315. As will be described in greater detail below, TLB 313 utilizes information from both regions registers 309 and virtual address 305 to determine physical address 315.

In the event there is a TLB miss in TLB 313, a TLB replacement 323 is provided. Computer system 301 includes a virtual hash page table (VHPT) 325 which is configured to provide TLB 313 with TLB replacement 323. It is appreciated that although the present invention is described with specific detail concerning the VHPT, the present invention may also be applied to any page table structure. In some instances, the present invention performs a page table walk of VHPT 325 to provide TLB replacement 323, similar to the page table walk of page table 111 in prior art computer system 101. In other instances, a software routine may be executed in software 327 to provide TLB replacement 323 to TLB 313 in the event of a TLB miss. Selection logic 321 is coupled to receive a TLB miss signal 323 from TLB 313 as well as an enable bit VE (VHPT Enable) 319 from a master register 317. In contrast with the prior art, selection logic 321 of the present invention is also coupled to region registers 309 to receive an additional enable bit VE 311 associated with the particular region being addressed by the N bits 307 of virtual address 305. Furthermore, computer system 301 includes alternate vectors 329 which are accessed by selection logic 321 when a software routine in software 327 is to be executed to provide a TLB replacement 323 to TLB 313.

Operation of one embodiment of the present invention is as follows. When translating a virtual address 305 into a physical address 315, TLB 313 receives information from virtual address 305 and the corresponding region register 309 to determine physical address 315. If there is a TLB hit, physical address 315 is determined from information contained in TLB 313 corresponding with the virtual address 305 and associated region register 309. If there is a TLB miss, such a condition is indicated by TLB miss signal 323 to selection logic 321. The VHPT walker is enabled by the "and" condition of the two control bits VE bit 319 and the VE bit 311 of the corresponding region identified by N bits 307.

With particular reference to the region registers 309, each region register defines its particular regions attributes. The VE bit 311 of each region register 309 controls whether the VHPT structure 325 is to be searched for TLB misses occurring in that particular region. When the region registers VE bit 311 is set, the VHPT search is performed for TLB misses occurring in that particular region independent of all of the other regions. When the VE bit 311 is not set for that particular region, the VHPT search is not performed on the TLB misses for that particular region. Instead, an alternate software routine in software 327 as identified by alternate vectors 329 is performed. It is appreciated that by optionally providing the alternate TLB miss vectors 329 for particular regions, the operating system may implement different TLB insertion policies with its own software handlers.

Master register 317 also contains an enable bit VE 319 which in one embodiment of the present invention anchors the VHPT table in the virtual address space. Master register 317 includes the VE bit 319 to control the entire VHPT environment. When the VE bit 319 is deactivated, the VHPT search is unconditionally disabled for any TLB misses. That is, all the TLB misses are delivered to the alternate TLB miss vectors 329 when the VE bit 319 is disabled. If, the VE bit 319 is activated, the VHPT search is performed for TLB misses occurring in the region space if the corresponding VE bit 311 of region register 309 is also activated.

Accordingly, a page table walk of the VHPT 325 will be performed if selection logic 321 receives an active VE bit 319 of master register 317 and an active VE bit 311 from the corresponding region register 309. That is, if VE bit 319 and the VE bit 311 of a corresponding region register 309 are both active, then selection logic 321 will signal VHPT 325 through signal 331 to perform a page table walk of VHPT 325 to provide a TLB replacement 323 to TLB 313. If, however, the VE bit 311 of the region register 309 identified by N bits 307 is not enabled, then selection logic 321 signals the software routine in software 327 through signal 333 to provide the TLB replacement 323. Furthermore, an alternate vector 329 is included in computer system 301 to point to the starting address of a particular TLB replacement routine in memory. Accordingly, each particular region identified by bits 307 may utilize an optimized software routine in software 327 pointed to by alternate vector 329 to provide the TLB replacement 323 to TLB 313 in the event of a TLB miss.

In one embodiment of the present invention, alternate vectors 329 include separate alternate instruction TLB miss vector 335 and alternate data TLB miss vector 337. Alternate instruction TLB miss vector 335 identifies the software routine and software 327 to be executed in the event of an instruction TLB miss while alternate data TLB miss vector 337 identifies the software routine in software 327 to be executed in the event of a data TLB miss.

In another embodiment of the present invention, the disabling of the page table walk of the VHPT 325 allows the software TLB replacement algorithm to include performance monitoring code. That is, one can enable performance monitoring during TLB miss in one isolated region without effecting other regions or requiring a new kernel just for this purpose. A typical scenario might be that one may observe excessive TLB thrashing. A performance monitoring program in software 327 may be executed by deactivating the VE bit 311 of that particular region. Such a performance monitor routine may log the addresses and memory accesses into a buffer. This data can then be referenced by an application writer or a tool that assists the application writer in diagnosing problems. It is appreciated that the present invention provides this capability in isolated regions with the standard kernel without impacting other regions.

Figure 4:
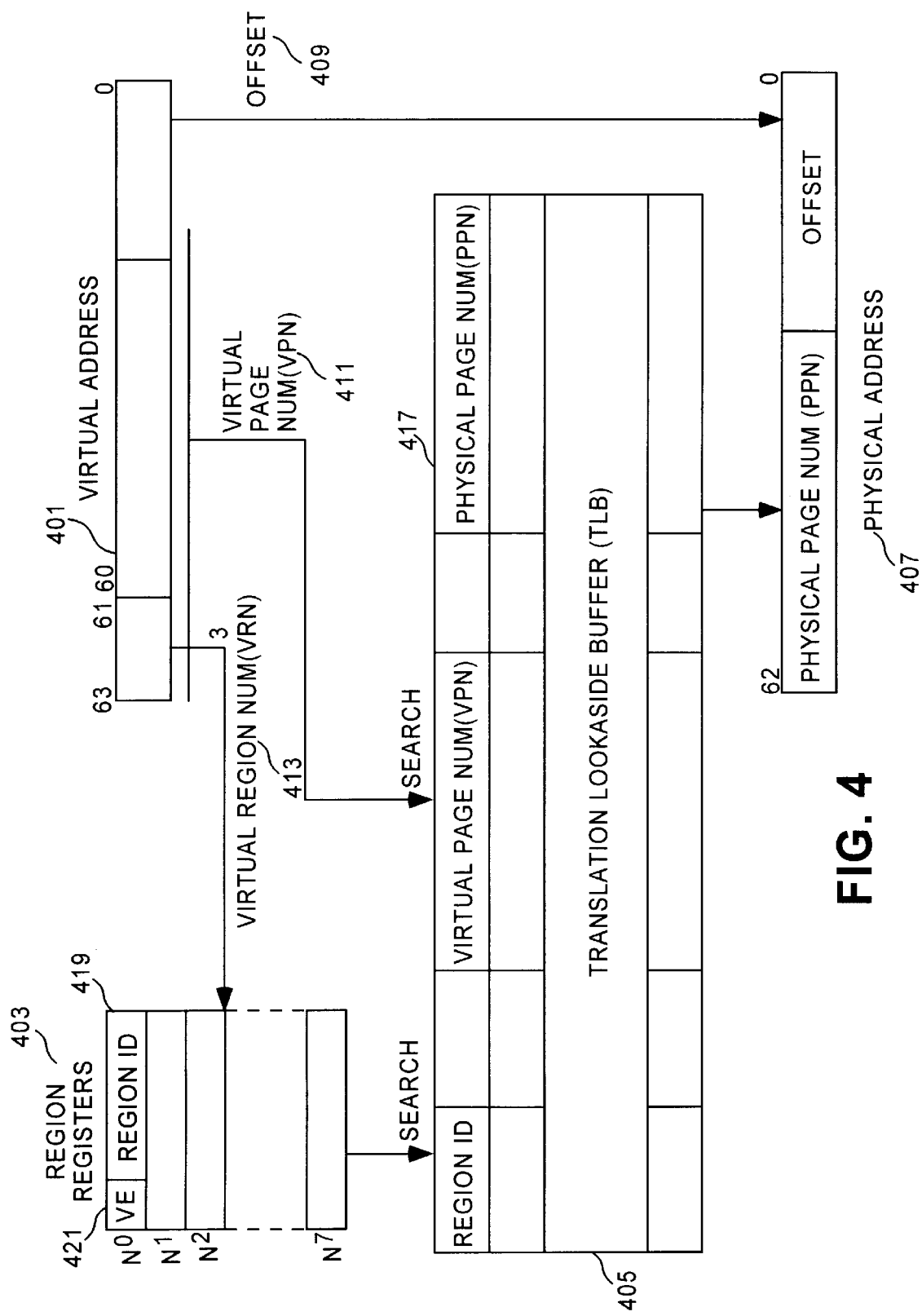
FIG. 4 is a block diagram illustrating how a physical address is generated from the virtual address in one embodiment of the present invention.

FIG. 4 is a block diagram illustrating how a virtual address 401 is translated into a physical address 407 in one embodiment of the present invention. As shown in FIG. 4, virtual address 401 includes a virtual region number (VRN) 413, a virtual page number (VPN) 411 and an offset 409. The VRN 413 identifies a particular region register 403. Each region register includes the VE bit 421 discussed above and a region ID 419.

When translating virtual address 401 into physical address 407, the TLB 405 of the present invention receives the region ID 419 and VPN and 411 of the particular virtual address 401 from region registers 403 and virtual address 401. The TLB is searched for an entry corresponding with the requested region ID and VPN. If that particular entry is found, a corresponding page entry, physical page number (PPN) 417 is identified and sent to physical address 407. The offset 409 of virtual address 401 is then combined with PPN 417 to construct physical address 407.

Figure 5:
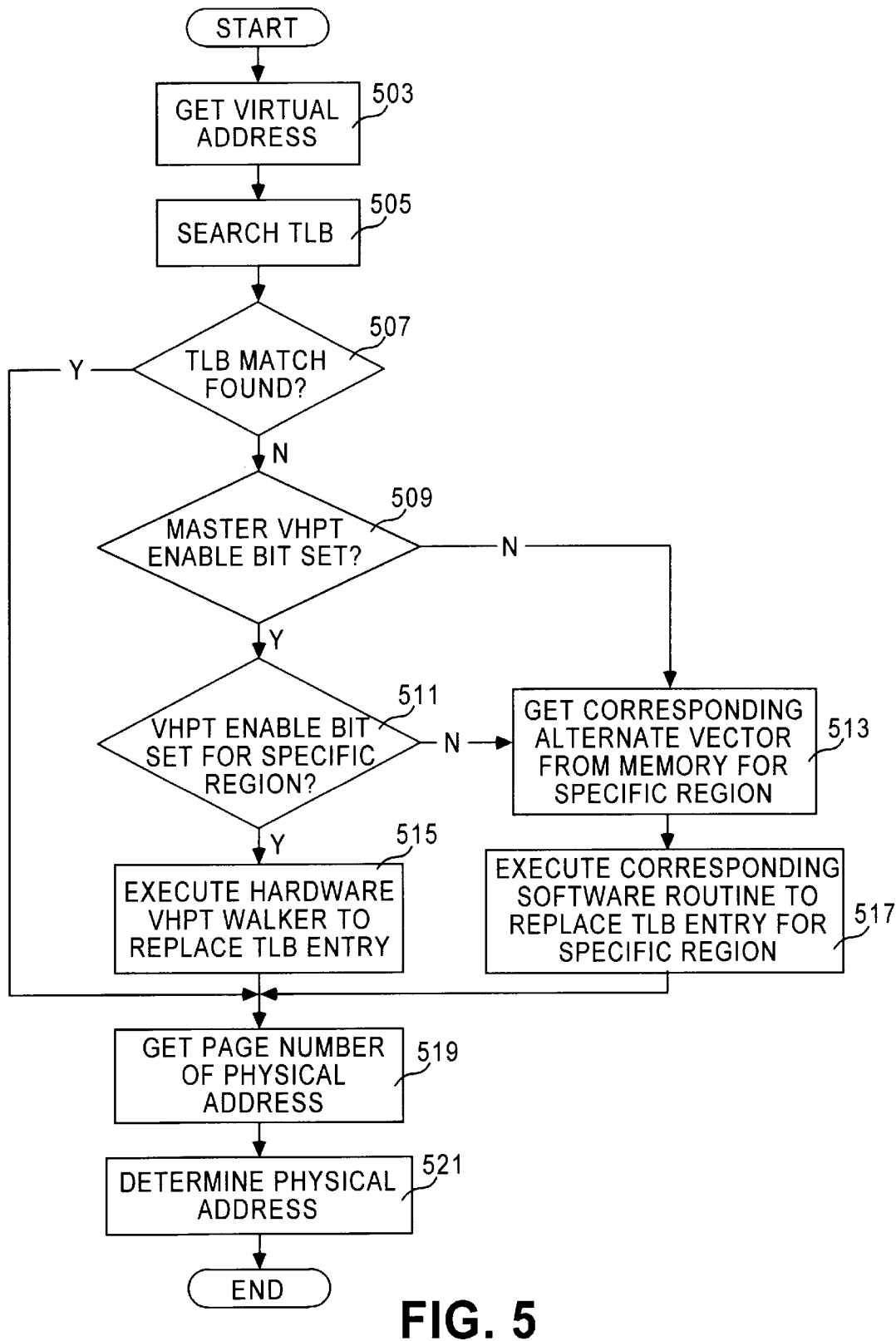
FIG. 5 is a flow diagram illustrating the steps performed in one embodiment of the present invention.

FIG. 5 is a flow diagram 501 of the processing steps performed in one embodiment of the present invention. As indicated in processing block 503, a virtual address is obtained. Next, the TLB is searched for a corresponding entry as shown in processing block 505. If a TLB match is found, then the page number of the physical address is obtained as indicated in processing block 519. If, however, a TLB match is not found, then it is determined whether the master VHPT enable bit is set and if the VHPT enable bit is set for the specific region as indicated in decision blocks 509 and 511. If so, then the page table walk is executed in hardware to replace the TLB entry. If either the master VHPT enable bit or the VHPT enable bit of a specific region is not set, then the corresponding alternate vector from memory for the specific region is accessed and the corresponding software routine in software is executed to replace the TLB entry for the specific region as indicated in processing 513 and 517. Once the page number of the physical address is obtained as shown in processing block 519, the physical address is built as indicated in processing block 521.

Thus, a method and an apparatus implementing a region based page table walk has been described. The disclosed region based page table walking allows a VHPT to be walked for some regions and dedicated software routines to be executed for other regions when a TLB miss occurs. The disclosed region based page table walk allows different paging policies to be applied to a particular regions of virtual memory since the default TLB insertion policy implemented in the VHPT structure may not be suitable for handling TLB misses for all regions at all times. Furthermore, the disclosed region based page table walk allows the implementation of other TLB miss related routines such as performance monitoring software to diagnose paging problems occurring in one region without effecting other regions or requiring a new kernel for this specific purpose.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. In a computer system having a processor and a memory coupled to the processor, an address translation mechanism configured to translate a virtual address into a physical address, the virtual address addressing a virtual memory organized into regions, comprising:

a region register having an enable indicator, the region register corresponding with a region of the virtual address;

a translation lookaside buffer (TLB) coupled to the region register and coupled to receive the virtual address, the TLB configured to contain a page entry used to determine the physical address;

a default replacing mechanism configured to provide the TLB with the page entry in response to a TLB miss and a first state of the region register enable indicator; and, an alternate replacement mechanism configured to provide to the TLB the page entry to determine the physical address in response to the TLB miss and a second state of the region register enable indicator.

2. The address translation mechanism described in claim 1 further comprising a master enable indicator, the default replacing mechanism configured to provide to the TLB with the page entry in response to the TLB miss, the first state of the region register enable indicator and a first state of the master enable indicator, the alternate replacement mechanism configured to provide to the TLB the page entry to determine the physical address in response to the TLB miss and a second state of the master enable indicator.

3. The address translation mechanism described in claim 2 wherein the default replacing mechanism comprises a virtual hash page table (VHPT) stored in the memory and a VHPT searching mechanism, the VHPT searching mechanism configured to search the VHPT for the TLB page entry in response to the TLB miss, the first state of the region register enable indicator and the first state of the master enable indicator.

4. The address translation mechanism described in claim 1 wherein the alternate replacement mechanism comprises an alternate TLB vector stored in the memory, the alternate TLB vector pointing to an alternate TLB routine stored in the memory, the alternate TLB routine when executed by the processor configured to provide the page entry to determine the physical address.

5. The address translation mechanism described in claim 4 wherein the alternate TLB routine comprises a performance monitoring routine.

6. The address translation mechanism described in claim 4 wherein the alternate TLB vector comprises an alternate instruction TLB vector and an alternate data TLB vector, the alternate instruction TLB vector pointing to an alternate instruction TLB routine stored in the memory, the alternate data TLB vector pointing to an alternate data TLB routine stored in the memory.

7. In a computer system having a processor and a memory coupled to the processor, a method for translating a virtual address into a physical address, the virtual address addressing a virtual memory organized into regions, the method comprising the steps of:

searching a translation lookaside buffer (TLB) for a page entry corresponding with the virtual address;

searching a page table stored in the memory for the page entry if there is a TLB miss in the step of searching the TLB and if a region register enable indicator is in a first state, the region register enable indicator corresponding with a region of the virtual address;

performing an alternate TLB replacement routine for the page entry if there is the TLB miss in the step of searching the TLB and if the region register enable indicator is in a second state; and, determining the physical address.

8. The method described in claim 7 wherein the step of searching the page table is performed when the region register enable indicator is in the first state and a master enable indicator is in a first state.

9. The method described in claim 7 wherein the step of performing the alternate TLB replacement routine is performed when a master enable indicator is in a second state.

10. The method described in claim 7 wherein the step of performing the alternate TLB replacement routine includes the step of accessing an alternate TLB miss vector to determine an address of the alternate TLB replacement routine.

11. The method described in claim 7 wherein the step of performing the alternate TLB replacement routine includes the step of accessing an alternate instruction TLB miss vector to determine an address of the alternate instruction TLB replacement routine.

12. The method described in claim 7 wherein the step of performing the alternate TLB replacement routine includes the step of accessing an alternate data TLB miss vector to determine an address of the alternate data TLB replacement routine.

13. The method described in claim 7 wherein the step of performing the alternate TLB replacement routine includes the step of performing a performance monitoring routine.

* * * * *